United States Patent
Yoon et al.

(10) Patent No.: US 12,471,472 B2
(45) Date of Patent: Nov. 11, 2025

(54) STEREOSCOPIC IMAGE DISPLAY PANEL AND STEREOSCOPIC IMAGE DISPLAY DEVICE

(71) Applicant: LG DISPLAY CO., LTD., Seoul (KR)

(72) Inventors: Jung Seop Yoon, Seoul (KR); Seong Wook Choi, Seoul (KR)

(73) Assignee: LG Display Co., Ltd (KR)

( * ) Notice: Subject to any disclaimer, the term of this patent is extended or adjusted under 35 U.S.C. 154(b) by 590 days.

(21) Appl. No.: 17/895,597

(22) Filed: Aug. 25, 2022

(65) Prior Publication Data

US 2023/0217762 A1 Jul. 6, 2023

(30) Foreign Application Priority Data

Dec. 30, 2021 (KR) .................. 10-2021-0193352

(51) Int. Cl.
| | | |
|---|---|---|
| *H10K 59/35* | (2023.01) | |
| *G02B 30/20* | (2020.01) | |
| *G02B 30/26* | (2020.01) | |
| *G02B 30/30* | (2020.01) | |
| *G02B 30/32* | (2020.01) | |
| *G02B 30/40* | (2020.01) | |
| *G09G 3/00* | (2006.01) | |
| *G09G 3/20* | (2006.01) | |
| *G09G 3/3208* | (2016.01) | |
| *G09G 3/3233* | (2016.01) | |
| *G09G 3/36* | (2006.01) | |
| *H10K 59/122* | (2023.01) | |

(52) U.S. Cl.
CPC ............ *H10K 59/35* (2023.02); *G02B 30/20* (2020.01); *G02B 30/26* (2020.01); *G02B 30/30* (2020.01); *G02B 30/32* (2020.01); *G02B 30/40* (2020.01); *G09G 3/2074* (2013.01); *G09G 3/3208* (2013.01); *G09G 3/3607* (2013.01); *H10K 59/352* (2023.02); *H10K 59/353* (2023.02); *G09G 3/003* (2013.01); *G09G 3/3233* (2013.01); *G09G 2300/0452* (2013.01); *G09G 2300/0842* (2013.01); *H10K 59/122* (2023.02)

(58) Field of Classification Search
CPC .... H10K 59/122; H10K 59/35; H10K 59/352; H10K 59/353; G02B 30/20; G02B 30/26; G02B 30/30; G02B 30/32; G02B 30/40; G09G 3/2074; G09G 3/3233; G09G 3/3208; G09G 3/3607; G09G 2300/0452; G09G 2300/0842; G09G 3/003
See application file for complete search history.

(56) References Cited

U.S. PATENT DOCUMENTS

2012/0229457 A1* 9/2012 Hamagishi ........... H04N 13/324
345/419

* cited by examiner

*Primary Examiner* — Cory A Almeida
(74) *Attorney, Agent, or Firm* — Fish & Richardson P.C.

(57) ABSTRACT

A stereoscopic image display device includes a stereoscopic image display panel that includes a plurality of left-eye subpixels configured to display a left-eye image, a plurality of right-eye subpixels configured to display a right-eye image, and a bank layer disposed at an interface between light-emitting regions of the subpixels, wherein the light-emitting region of each subpixel has a saw-toothed shape that remedies left-right luminance scattering of a stereoscopic image and implementing 2D and 3D with a single display panel.

19 Claims, 6 Drawing Sheets

FIG. 6

|  |  | #1 | #2 | #3 |  |
|---|---|---|---|---|---|
| Polar Angle | θ=20° | 152 nit | 141 nit | 143 nit | Avg. 145 nit |
|  | θ=25° | 235 nit | 223 nit | 215 nit | Avg. 224 nit |
|  | θ=30° | 510 nit | 484 nit | 506 nit | Avg. 500 nit |
|  | θ=35° | 1310 nit | 1270 nit | 1307 nit | Avg. 1295 nit |

FIG. 7

|  |  | #1 | #2 | #3 |  |
|---|---|---|---|---|---|
| Polar Angle | θ=20° | 101 nit | 96 nit | 94 nit | Avg. 97nit<br>Reduced by 33% compared to rectangular shape |
|  | θ=25° | 134 nit | 126 nit | 128 nit | Avg. 129 nit<br>Reduced by 42% compared to Rectangular shape |
|  | θ=30° | 303 nit | 278 nit | 289 nit | Avg. 290 nit<br>Reduced by 42% compared to Rectangular shape |
|  | θ=35° | 1127 nit | 1051 nit | 1158 nit | Avg. 1122 nit<br>Reduced by 14% compared to Rectangular shape | ic image display panel that substantially obviates
STEREOSCOPIC IMAGE DISPLAY PANEL AND STEREOSCOPIC IMAGE DISPLAY DEVICE

CROSS-REFERENCE TO RELATED APPLICATION

This application claims the priority of Korean Patent Application No. 10-2021-0193352, filed on Dec. 30, 2021, which is hereby incorporated by reference in its entirety.

BACKGROUND

Field of the Disclosure

The present disclosure relates to a stereoscopic image display panel.

Description of the Background

With recent development of display technology, stereoscopic effect realization technology capable of enabling viewers to feel as if they were in scenes has also been developed. That is, the paradigm changes from a 2D display in which high image quality realization is emphasized to a 3D display.

Currently developed 3D display types are classified into a glasses type and a non-glasses type. Representative examples of the glasses type are a passive glasses type and a shutter glasses type. The passive glasses type is a type in which a display device simultaneously outputs an image for the left eye and an image for the right eye and a user views the image for the left eye through the left eye and the image for the right eye through the right eye using passive glasses. This type has an advantage in that the display does not flicker, whereby eye fatigue is decreased, but has a disadvantage in that the passive glasses are used, whereby image quality is lowered. On the other hand, the shutter glasses type is a type in which an image for the left eye and an image for the right eye are sequentially reproduced and the user views the reproduced images through glasses configured such that left and right shutters are alternately opened and closed. This type has an advantage in that lowering in image quality is relatively less but has a disadvantage in that the display flickers, whereby eye fatigue is increased.

There are a lenticular lens type and a parallax barrier type as representative examples of a non-glasses type 3D display realization method.

SUMMARY

Accordingly, the present disclosure is directed to a stereoscopic image display panel that substantially obviates one or more problems due to limitations and disadvantages described above.

More specifically, the present disclosure to provide a stereoscopic image display panel capable of remedying left-right luminance scattering of a stereoscopic image and implementing both 2D and 3D with a single display panel.

Additional advantages and features of the present disclosure will be set forth in part in the description which follows and in part will become apparent to those having ordinary skill in the art upon examination of the following or may be learned from practice of the present disclosure. Other advantages of the present disclosure may be realized and attained by the structure particularly pointed out in the written description and claims hereof as well as the appended drawings.

To achieve these and other advantages and in accordance with the present disclosure, as embodied and broadly described herein, a stereoscopic image display panel includes a plurality of left-eye subpixels configured to display a left-eye image, a plurality of right-eye subpixels configured to display a right-eye image, and a bank layer disposed at the interface between light-emitting regions of the subpixels, wherein the light-emitting region of each subpixel is formed in a saw-toothed shape.

The plurality of left-eye subpixels and the plurality of right-eye subpixels may include red, green, and blue subpixels, and the red, green, and blue subpixels may have different saw-toothed light-emitting regions.

One of the red, green, and blue subpixels may have a hexagonal light-emitting region, another of the red, green, and blue subpixels may have a light-emitting region formed in a shape in which two hexagons are coupled to each other in the state in which one side thereof is shared, and the other of the red, green, and blue subpixels may have a light-emitting region formed in a shape in which three hexagons are coupled to each other in a line in the state in which two sides thereof are shared and in which a portion of each of an upper surface and a lower surface thereof is cut.

The red subpixel may have a hexagonal light-emitting region, the green subpixel may have a light-emitting region formed in a shape in which two hexagons are coupled to each other in the state in which one side thereof is shared, and the blue subpixel may have a light-emitting region formed in a shape in which three hexagons are coupled to each other in a line in the state in which two sides thereof are shared and in which a portion of each of an upper surface and a lower surface thereof is cut.

The plurality of left-eye subpixels and the plurality of right-eye subpixels may include red, green, and blue subpixels, and the red, green, and blue subpixels may have identical saw-toothed light-emitting regions.

Each of the red, green, and blue subpixels may have any one of a hexagonal light-emitting region, a light-emitting region formed in a shape in which two hexagons are coupled to each other in the state in which one side thereof is shared, and a light-emitting region formed in a shape in which three hexagons are coupled to each other in a line in the state in which two sides thereof are shared and in which a portion of each of an upper surface and a lower surface thereof is cut.

A color arrangement sequence of the plurality of left-eye subpixels and a color arrangement sequence of the plurality of right-eye subpixels may be different from each other.

Positions of the light-emitting regions of the plurality of left-eye subpixels and positions of the light-emitting regions of the plurality of right-eye subpixels may be different from each other.

Each of the light-emitting regions of the plurality of left-eye subpixels may be disposed between the light-emitting regions of the plurality of right-eye subpixels adjacent thereto, and each of the light-emitting regions of the plurality of right-eye subpixels may be disposed between the light-emitting regions of the plurality of left-eye subpixels adjacent thereto.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of the present disclosure, illustrate aspect(s) of the present disclosure and together with the description serve to explain the principle of the present disclosure.

In the drawings:

FIG. 6 is a table showing left-right luminance scattering when a subpixel is rectangular; and FIG. 7 is a table showing left-right luminance scattering when a subpixel is saw-toothed according to the present disclosure.

DETAILED DESCRIPTION

Figure 1:
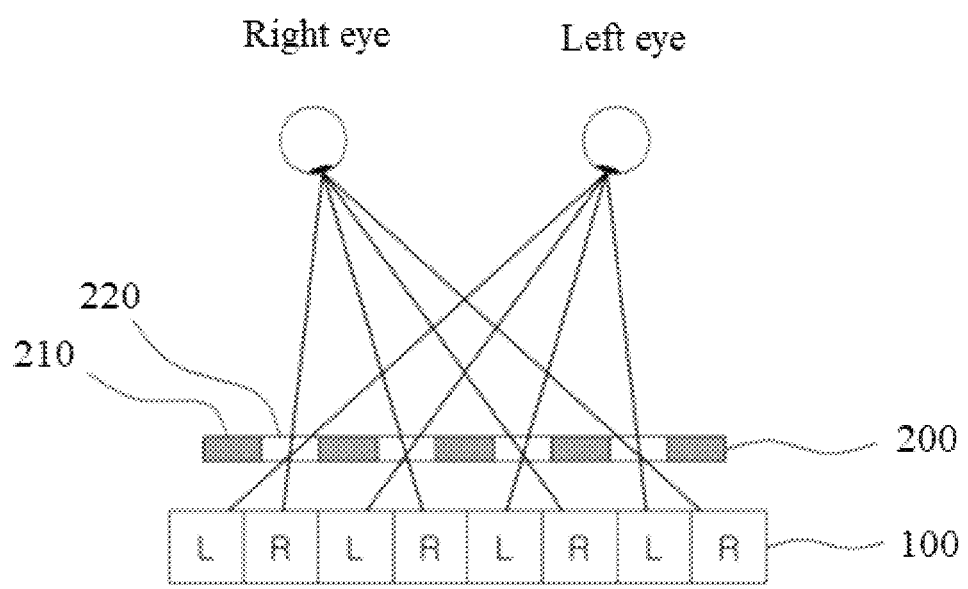
FIG. 1 is a view illustrating a parallax barrier type 3D display mode according to the present disclosure.

Advantages and features of the present disclosure and methods of achieving the same will be more clearly understood from aspects described below with reference to the accompanying drawings. However, the present disclosure is not limited to the following aspects and may be implemented in various different forms. The aspects are provided merely to complete the disclosure of the present disclosure and to fully inform a person having ordinary skill in the art to which the present disclosure pertains of the category of the present disclosure. The present disclosure is defined only by the category of the claims.

In the drawings for explaining the exemplary aspects of the present disclosure, for example, the illustrated shape, size, ratio, angle, and number are given by way of example, and thus, are not limitative of the disclosure of the present disclosure. Throughout the present specification, the same reference numerals designate the same constituent elements. Also, in the following description, a detailed description of known functions incorporated herein will be omitted when it may make the subject matter of the present disclosure rather unclear.

The terms "comprises", "includes", and "has", used in this specification, do not preclude the presence or addition of other elements unless used along with the term "only." The singular forms are intended to include the plural forms as well, unless the context clearly indicates otherwise.

In the interpretation of constituent elements, the constituent elements are interpreted as including an error range even if there is no explicit description thereof.

When a positional relationship is described, for example, when the positional relationship between two parts is described using terms such as "on", "above," "under," "beside," etc., one or more additional parts may be located between the two parts unless the term "immediately" or "directly" is used.

When a temporal relationship is described, for example, when time sequences such as "after," "subsequently," "next," and "before" are described, discontinuous sequences may be included unless the term "immediately" or "directly" is used.

Although terms such as, for example, "first" and "second" may be used to describe various elements, these terms are merely used to distinguish the same or similar elements from each other. Therefore, in the present specification, an element modified by "first" may be the same as an element modified by "second" within the technical scope of the present disclosure unless mentioned otherwise.

The terms "X-axis direction", "Y-axis direction", and "Z-axis direction" should not be interpreted as only geometrical relationships in which they are perpendicular to each other, and may have wider directivities within a range in which the construction of the present disclosure is functionally operated.

The term "at least one" should be understood as including all combinations that can be presented from one or more related items. For example, "at least one of a first item, a second item, and a third item" may mean combinations of all items that can be presented from two or more, among the first item, the second item, and the third item, as well as the first item, the second item, or the third item.

Features of various aspects of the present disclosure may be partially or entirely coupled to or combined with each other, and may be technically interlocked and driven in various manners. Various aspects may be realized independently or in combination with each other.

Hereinafter, the present disclosure will be described in more detail with reference to the accompanying drawings.

FIG. 1 is a schematic view showing the construction of a stereoscopic image display device according to the present disclosure. As shown in FIG. 1, the stereoscopic image display device according to the present disclosure includes a display panel 100 configured to display an image and a parallax barrier 200 disposed in front of the display panel 100.

The parallax barrier 200 has a plurality of line patterns. For example, the parallax barrier 200 includes a plurality of blocking regions 210 configured to block light from the display panel 100 and a plurality of transmission regions 220 configured to transmit light from the display panel 100.

The plurality of blocking regions 210 and the plurality of transmission regions 220 are configured in a line shape and alternately disposed.

The display panel 100 may be a plasma display panel (PDP), a plasma address liquid crystal display panel (PALC), a liquid crystal display (LCD) panel, or an organic light-emitting diode (hereinafter referred to as an "OLED") panel. For the convenience of description, the description will be given based on the OLED panel.

The OLED panel includes a plurality of data lines, a plurality of scan lines, and a plurality of subpixels formed at intersections between the data lines and the scan lines.

Each subpixel of the OLED panel includes an organic light-emitting diode and a pixel circuit configured to independently drive the organic light-emitting diode (OLED).

The organic light-emitting diode (OLED) is a self-emissive device having a structure in which a light-emitting layer is disposed between a first electrode and a second electrode and in which the light-emitting layer emits light through recombination of electrons and holes.

The pixel circuit includes a driving thin film transistor (TFT) configured to control driving current flowing in the OLED according to a gate-source voltage, a capacitor configured to maintain the uniform gate-source voltage of the driving TFT during one frame, and at least one switching thin film transistor (TFT) configured to program the gate-source voltage of the driving TFT in response to a gate signal.

Here, a unit pixel may be constituted by three or more subpixels.

The display panel 100 displays frames in which images L for the left eye and images R for the right eye are alternately disposed in the X-axis direction. At this time, the images L for the left eye and the images R for the right eye are incident on the left eye and the right eye of a viewer by the parallax barrier 200. As a result, the viewer may feel a stereoscopic effect due to binocular parallax.

When a subpixel that displays the images L for the left eye and the images R for the right eye is rectangular, left-right luminance scattering of the display panel 100 may be increased.

In the present disclosure, therefore, the subpixel is formed so as to have a hexagonal shape, not a rectangular shape, in order to reduce left-right luminance scattering.

Figure 2:
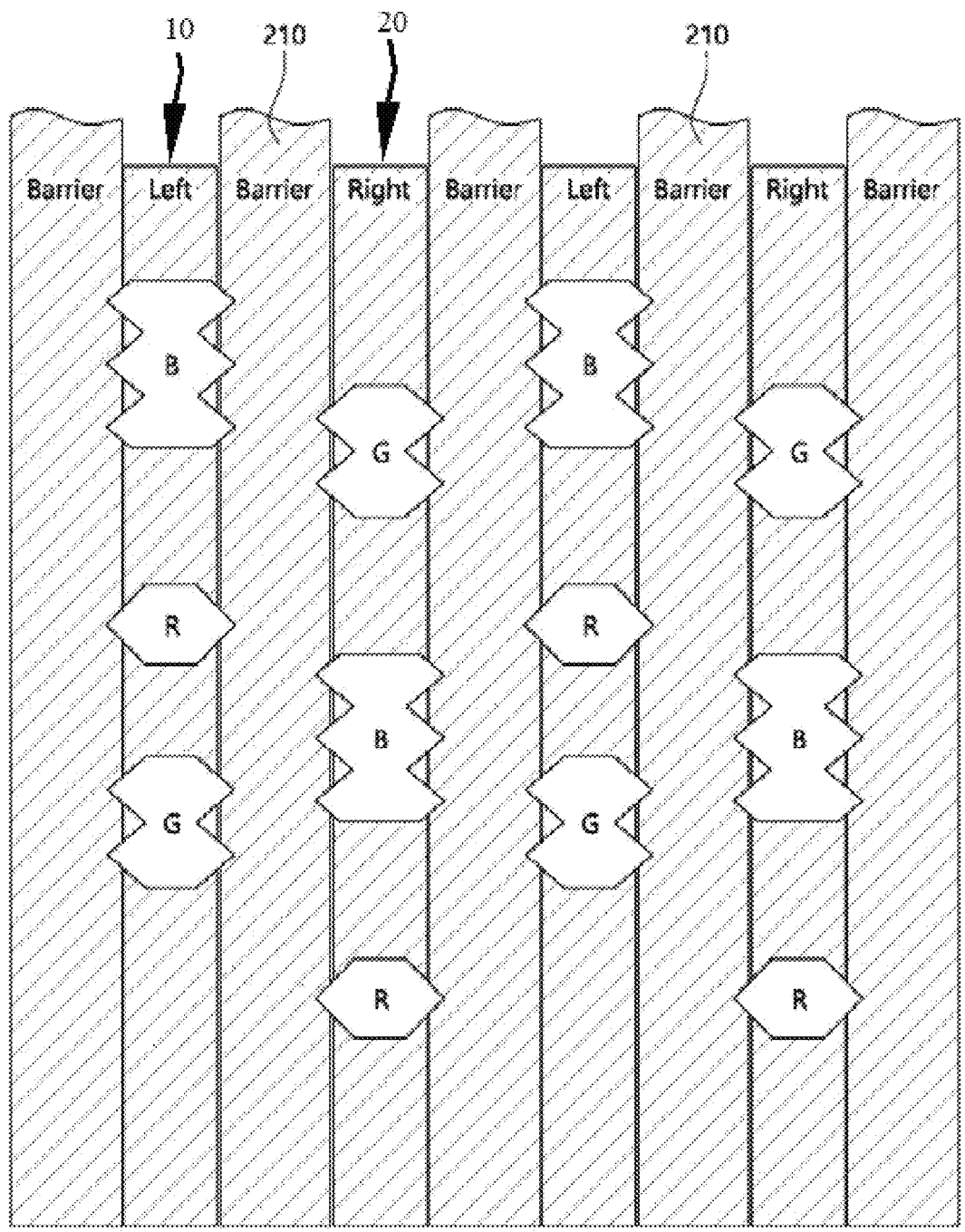
FIG. 2 is a plan view of a stereoscopic image display panel according to the present disclosure.

FIG. 2 is a plan view of a stereoscopic image display panel 100 according to the present disclosure.

The stereoscopic image display panel 100 according to the present disclosure includes a plurality of left-eye subpixels 10 configured to display a left-eye image and a plurality of right-eye subpixels 20 configured to display a right-eye image.

Each subpixel includes a light-emitting region, and a bank layer is disposed at the interface between the light-emitting regions of the subpixels.

The plurality of left-eye subpixels 10 and the plurality of right-eye subpixels 20 include a green subpixel G, a red subpixel R, and a blue subpixel B.

Each of the green subpixel G, the red subpixel R, and the blue subpixel B has a saw-toothed shape light-emitting region on side surfaces along the left-eye subpixels 10 and the right-eye subpixels 20, or each of the green subpixel G, the red subpixel R, and the blue subpixel B has at least one hexagonal shape, so that some of the subpixels can have a shape of two or three combined hexagons.

Light-emitting regions of the green subpixel G, the red subpixel R, and the blue subpixel B have different saw-toothed shapes.

For example, the light-emitting region of the red subpixel R has a hexagonal shape.

The light-emitting region of the green subpixel G has a shape in which two hexagons are coupled to each other in the state in which one side thereof is shared.

The light-emitting region of the blue subpixel B has a shape in which three hexagons are coupled to each other in a line in the state in which two sides thereof are shared and in which a portion of each of an upper surface and a lower surface thereof is cut. However, the present disclosure is not limited thereto.

All of the subpixels may have light-emitting regions identically formed in any one of the three shapes. That is, all of the subpixels may each have a hexagonal light-emitting region, a light-emitting region formed in a shape in which two hexagons are coupled to each other in the state in which one side thereof is shared, or a light-emitting region formed in a shape in which three hexagons are coupled to each other in a line in the state in which two sides thereof are shared and in which a portion of each of an upper surface and a lower surface thereof is cut.

That is, the light-emitting region of each subpixel adjacent to the blocking region of the parallax barrier 200 may be formed so as to have a saw-toothed shape.

The light-emitting region of each of the green subpixel G, the red subpixel R, and the blue subpixel B is shown as being exposed by a bank layer in the light-emitting layer disposed between the first electrode and the second electrode.

The light-emitting regions of the plurality of left-eye subpixels 10 and the light-emitting regions of the plurality of right-eye subpixels 20 have different arrangements. For example, the plurality of left-eye subpixels 10 may be arranged in the order of the blue subpixel B, the red subpixel R, and the green subpixel G in a Y-axis direction, and the plurality of right-eye subpixels 20 adjacent to the plurality of left-eye subpixels 10 may be arranged in the order of the green subpixel G, the blue subpixel B, and the red subpixel R in the Y-axis direction.

In addition, the light-emitting regions of the plurality of left-eye subpixels 10 and the light-emitting regions of the plurality of right-eye subpixels 20 have different dispositions.

That is, each of the light-emitting regions of the plurality of left-eye subpixels 10 may be disposed between the light-emitting regions of the plurality of right-eye subpixels 20 adjacent thereto. In the same manner, each of the light-emitting regions of the plurality of right-eye subpixels 20 may be disposed between the light-emitting regions of the plurality of left-eye subpixels 10 adjacent thereto.

In addition, the display panel 100 and the parallax barrier 200 are disposed such that the blocking regions 210 of the parallax barrier 200 correspond to the bank layers between the light-emitting regions of the plurality of left-eye subpixels 10 and the light-emitting regions of the plurality of right-eye subpixels 20.

The blocking regions 210 of the parallax barrier 200 may overlap edges of the light-emitting regions of the plurality of left-eye subpixels 10 adjacent thereto and edges of the light-emitting regions of the plurality of right-eye subpixels 20 adjacent thereto.

Figure 3:
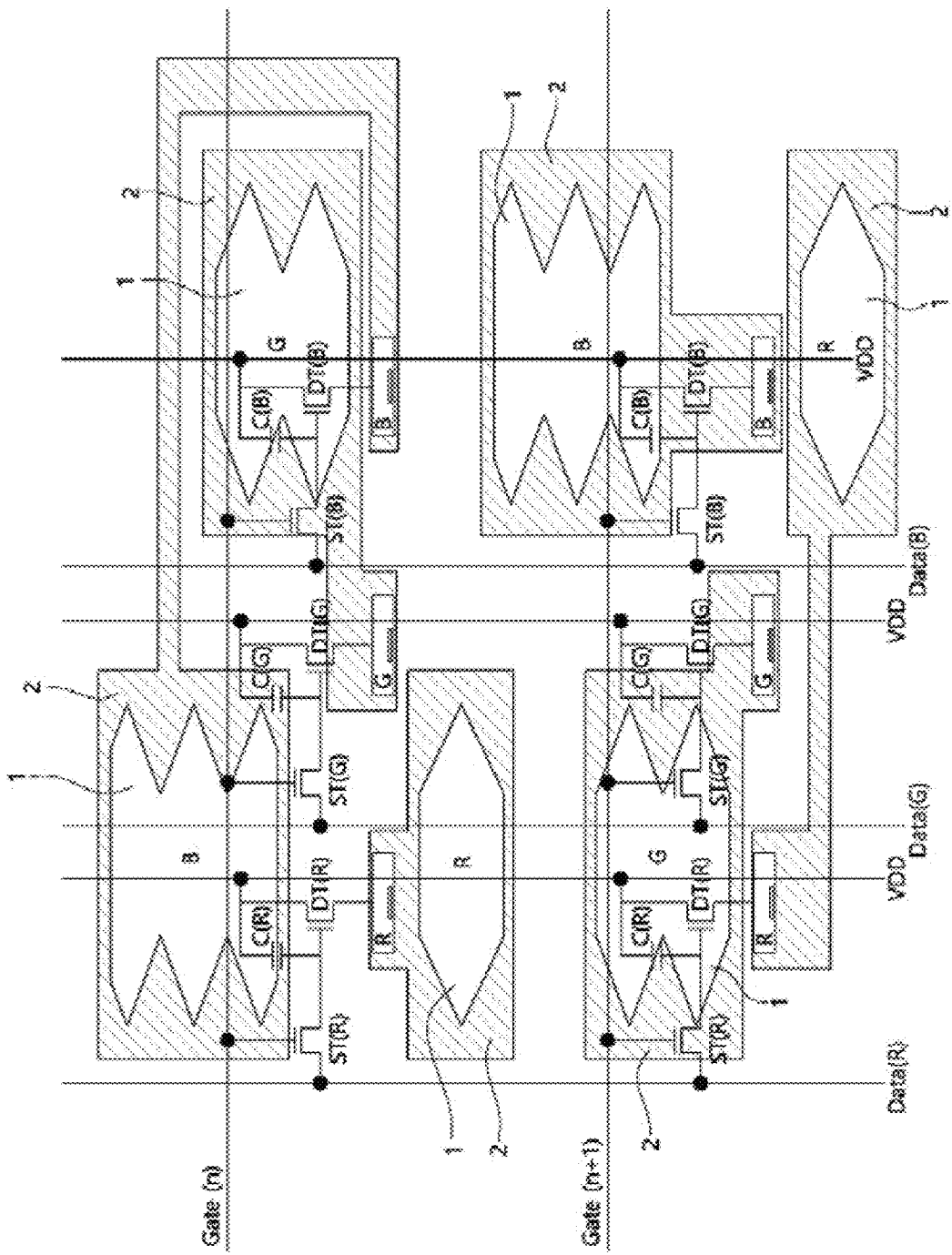
FIG. 3 is a view showing the construction of an organic light-emitting device of each subpixel of a stereoscopic image display panel according to the present disclosure and a pixel circuit configured to independently drive the organic light-emitting device.

FIG. 3 is a view showing the construction of an organic light-emitting device of each subpixel of the stereoscopic image display panel 100 according to the present disclosure and a pixel circuit configured to independently drive the organic light-emitting device.

As described above, the light-emitting region of the green subpixel G, the red subpixel R, and the blue subpixel B has a shape exposed by the bank layer in the light-emitting layer disposed between the first electrode and the second electrode, in the organic light-emitting device.

Consequently, only the light-emitting layer 1 and the first electrode 2 of each organic light-emitting device (OLED) are shown.

In addition, a plurality of gate lines GL(n) and GL(n+1) may be arranged in the X-axis direction, and a plurality of data lines Date(R), Data(G), and Data(B) and high-voltage supply lines VDD may be arranged in the Y-axis direction.

A pixel circuit configured to independently drive the organic light-emitting device is disposed at the intersection between each of the gate lines GL(n) and GL(n+1) and a corresponding one of the data lines Date(R), Data(G), and Data(B).

The pixel circuit configured to independently drive each organic light-emitting device (OLED) includes a driving TFT DT(R), DT(G), or DT(B) configured to control driving current flowing in the organic light-emitting device (OLED) according to gate-source voltage, a capacitor C(R), C(G), or C(B) configured to maintain uniform the gate-source voltage of the driving TFT DT(R), DT(G), or DT(B) during one frame, and at least one switching TFT ST(R), ST(G), or ST(B) configured to program the gate-source voltage of the driving TFT DT(R), DT(G), or DT(B) in response to a gate signal.

For example, a red pixel circuit including a driving TFT DT(R), a capacitor C(R), and a switching TFT ST(R), the red pixel circuit being configured to drive an organic light-emitting device of a red subpixel, is provided at the intersection between each gate line GL(n) or GL(n+1) and a first data line Data(R), to which red data voltage is supplied.

A blue pixel circuit including a driving TFT DT(B), a capacitor C(B), and a switching TFT ST(B), the blue pixel circuit being configured to drive an organic light-emitting device of a blue subpixel, is provided at the intersection between each gate line GL(n) or GL(n+1) and a second data line Data(B), to which blue data voltage is supplied.

A green pixel circuit including a driving TFT DT(G), a capacitor C(G), and a switching TFT ST(G), the green pixel circuit being configured to drive an organic light-emitting device of a green subpixel, is provided at the intersection between each gate line GL(n) or GL(n+1) and a third data line Data(G), to which green data voltage is supplied.

However, a corresponding organic light-emitting device may not be disposed in a subpixel region adjacent to each color pixel circuit.

For example, a first electrode 2 of an organic light-emitting device B of a blue subpixel, among the plurality of left-eye subpixels 10, detours an organic light-emitting device G of a green subpixel, among the subpixels 20, and is connected to a driving TFT DT(B) of a blue pixel circuit.

Figure 4:
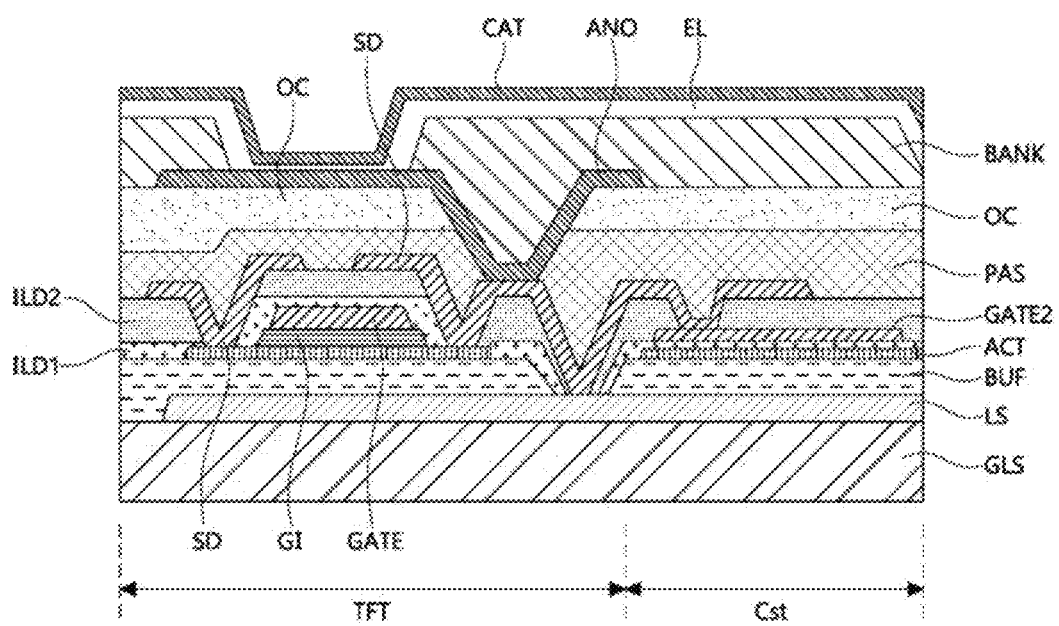
FIG. 4 is a cross-sectional view of one subpixel of the stereoscopic image display panel according to the present disclosure.

FIG. 4 is a cross-sectional view of one subpixel of the stereoscopic image display panel 100 according to the present disclosure, i.e. a sectional view of a red organic light-emitting device of a left-eye subpixel 10.

As shown in FIG. 4, a first metal pattern LS is formed on a substrate GLS. The first metal pattern LS is disposed under a TFT to block light irradiated to the TFT. Here, the TFT corresponds to the driving TFT DT(R) shown in FIG. 3.

A buffer layer BUF is made of an inorganic insulating material, such as SiO2 and SiNx, and covers the first metal pattern LS.

An active pattern ACT of a thin film transistor TFT part includes a semiconductor channel layer of the TFT. A portion of the active pattern ACT may be used as a lower electrode of a capacitor Cst. When the TFT is implemented as an oxide TFT, the active pattern ACT may include indium gallium zinc oxide (IGZO). The capacitor Cst corresponds to the capacitor C(R) shown in FIG. 3.

A gate dielectric film GI is formed on the active pattern ACT of the thin film transistor TFT part. The gate dielectric film GI may be made of an inorganic insulating material.

First and second interlayer dielectric layers ILD1 and ILD2 are disposed between a third metal pattern GATE and a fourth metal pattern SD to insulate these metal patterns from each other.

In the capacitor Cst part, a second metal pattern GATE2 is formed on the interlayer dielectric layer ILD1. The second metal pattern GATE2 includes an upper electrode of the capacitor Cst.

The third metal pattern GATE disposed in the thin film transistor TFT part includes a gate electrode of the TFT.

The fourth metal pattern SD includes a source electrode and a drain electrode of the TFT.

The source electrode and the drain electrode of the TFT are electrically connected to the active pattern ACT via contact holes formed through the first and second interlayer dielectric layers ILD1 and ILD2. In the capacitor Cst part, the fourth metal pattern SD is electrically connected to the second metal pattern GATE2 via contact holes formed through the second interlayer dielectric layer ILD2.

A passivation layer PAS covers the thin film transistor TFT part and the capacitor Cst part. The passivation layer PAS may be made of an inorganic insulating material.

A planarization layer OC covers the passivation layer PAS to planarize the surface thereof. The planarization layer OC may be made of an organic insulating material.

An anode ANO of a light-emitting device (OLED) is disposed on the planarization layer OC so as to contact the fourth metal pattern of the TFT via a contact hole formed through the passivation layer PAS and the planarization layer OC. The anode ANO may include a metal material.

A bank pattern BANK is made of an organic insulating material, and is disposed on a portion of the anode ANO and the planarization layer OC to define a light-emitting region.

An organic compound layer EL of the light-emitting device (OLED) is disposed on an exposed region of the anode defined by the bank pattern BANK, and is disposed on the bank pattern BANK.

A cathode CAT of the light-emitting device (OLED) is disposed on the organic compound layer EL. The cathode may include a transparent metal electrode material, such as indium zinc oxide (IZO).

Here, the anode ANO corresponds to the first electrode 2 of FIG. 3.

Figure 5:
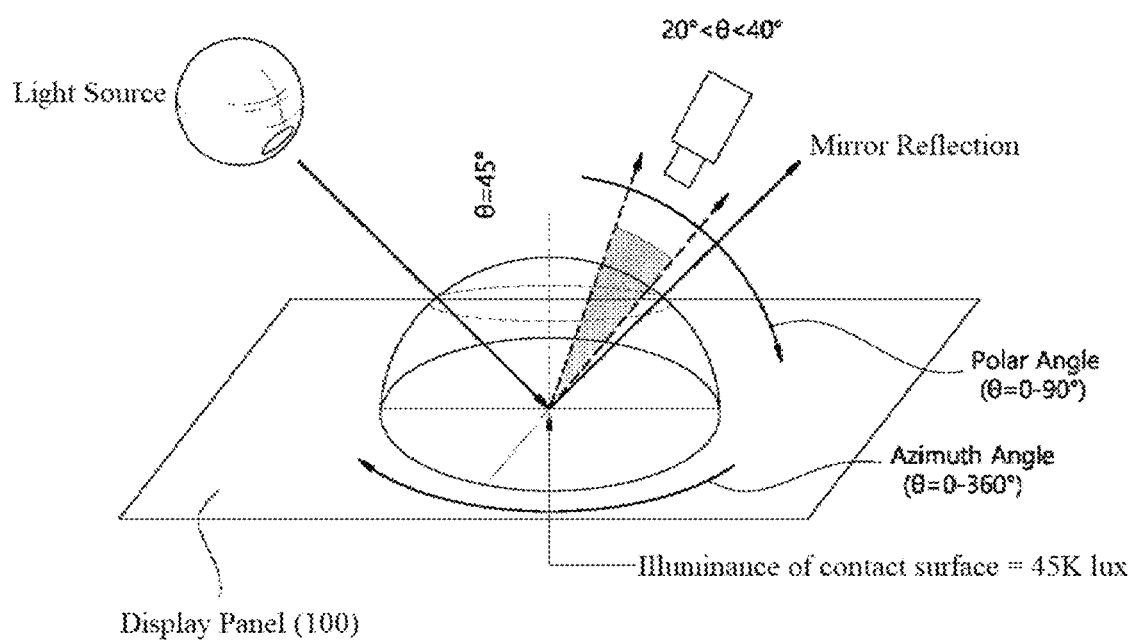
FIG. 5 is a schematic view illustrating the principle by which left-right luminance scattering is measured.

FIG. 5 is a view illustrating the principle by which left-right luminance scattering is measured.

As shown in FIG. 5, left-right luminance scattering is measured by irradiating light at an angle of 45 degrees in the state in which the display panel 100 is located in the X-axis direction and photographing the light using a camera within a range of 20 to 40 degrees between the reflected angle of the irradiated light and the Y axis.

FIG. 6 is a table showing left-right luminance scattering when a subpixel is rectangular, and FIG. 7 is a table showing left-right luminance scattering when a subpixel is saw-toothed according to the present disclosure.

FIGS. 6 and 7 show left-right luminance scattering values measured three times according to the measurement principle shown in FIG. 5 with measurement angles of 20 degrees, 25 degrees, 30 degrees, and 35 degrees.

As shown in FIGS. 6 and 7, in the present disclosure, the subpixel is formed so as to have a saw-toothed shape or single/multiple hexagonal shape, and left-right luminance scattering caused by the rectangular shape subpixels can be reduced.

As is apparent from the above description, a stereoscopic image display panel according to an aspect of the present disclosure has the following effect.

In the present disclosure, a subpixel is formed so as to have a saw-toothed shape or single/multiple hexagonal shape, so that left-right luminance scattering caused by the rectangular subpixels can be reduced.

It will be apparent to those skilled in the art from the above description that various modifications and alterations are possible without departing the technical idea of the present disclosure. Therefore, the technical scope of the present disclosure should be restricted not by the above detailed description of the present disclosure but by the accompanying claims.

What is claimed is:

1. A stereoscopic image display panel comprising:
   a plurality of left-eye subpixels configured to display a left-eye image;

a plurality of right-eye subpixels configured to display a right-eye image; and a bank layer disposed at an interface between light-emitting regions of the left-eye subpixels and the right-eye subpixels, wherein the plurality of left-eye subpixels and the plurality of right-eye subpixels comprise subpixels that have one of (i) two combined hexagonal shapes sharing one side or (ii) three combined hexagonal shapes sharing two sides, as viewed in a plan view.

2. The stereoscopic image display panel according to claim 1, wherein the plurality of left-eye subpixels and the plurality of right-eye subpixels include red, green, and blue subpixels, and the light-emitting regions of the red, green, and blue subpixels have different saw-toothed shapes.

3. The stereoscopic image display panel according to claim 2, wherein the plurality of left-eye subpixels and the plurality of right-eye subpixels further comprise subpixels that have one hexagonal shape, wherein a first group of the red, green, and blue subpixels has one hexagonal light-emitting region, a second group of the red, green, and blue subpixels has a light-emitting region formed in a shape in which two hexagons are coupled to each other in a state in which one side thereof is shared, and a third group of the red, green, and blue subpixels has a light-emitting region formed in a shape in which three hexagons are coupled to each other in a line in a state in which two sides thereof are shared and in which a portion of each of an upper surface and a lower surface thereof is cut.

4. The stereoscopic image display panel according to claim 3, wherein the red subpixel has a hexagonal light-emitting region, the green subpixel has a light-emitting region formed in a shape in which two hexagons are coupled to each other in a state in which one side thereof is shared, and the blue subpixel has a light-emitting region formed in a shape in which three hexagons are coupled to each other in a line in a state in which two sides thereof are shared and in which a portion of each of an upper surface and a lower surface thereof is cut.

5. The stereoscopic image display panel according to claim 1, wherein the plurality of left-eye subpixels and the plurality of right-eye subpixels include red, green, and blue subpixels, and wherein each of the red, green, and blue subpixels has one of a light-emitting region formed in a shape in which two hexagons are coupled to each other in a state in which one side thereof is shared, and a light-emitting region formed in a shape in which three hexagons are coupled to each other in a line in a state in which two sides thereof are shared and in which a portion of each of an upper surface and a lower surface thereof is cut.

6. The stereoscopic image display panel according to claim 1, wherein a color arrangement sequence of the plurality of left-eye subpixels and a color arrangement sequence of the plurality of right-eye subpixels are different from each other.

7. The stereoscopic image display panel according to claim 1, wherein positions of the light-emitting regions of the plurality of left-eye subpixels and positions of the light-emitting regions of the plurality of right-eye subpixels are different from each other.

8. The stereoscopic image display panel according to claim 7, wherein each of the light-emitting regions of the plurality of left-eye subpixels is disposed between the light-emitting regions of the plurality of right-eye subpixels adjacent thereto, and each of the light-emitting regions of the plurality of right-eye subpixels is disposed between the light-emitting regions of the plurality of left-eye subpixels adjacent thereto.

9. A stereoscopic image display device comprising:

a stereoscopic image display panel;

a plurality of left-eye subpixels configured to display a left-eye image;

a plurality of right-eye subpixels configured to display a right-eye image;

a bank layer disposed at an interface between light-emitting regions of the left-eye subpixels and the right-eye subpixels, wherein the plurality of left-eye subpixels and the plurality of right-eye subpixels comprise subpixels that have one of (i) two combined hexagonal shapes sharing one side or (ii) three combined hexagonal shapes sharing two sides, as viewed in a plan view; and a parallax barrier disposed in front of the stereoscopic image display panel and including a plurality of blocking regions configured to block light from the stereoscopic image display panel and a plurality of transmission regions configured to transmit the light from the stereoscopic image display panel.

10. The stereoscopic image display device according to claim 9, wherein the stereoscopic image display panel and the parallax barrier are disposed such that the blocking regions of the parallax barrier correspond to bank layers between the light-emitting regions of the plurality of left-eye subpixels and the light-emitting regions of the plurality of right-eye subpixels.

11. A stereoscopic image display panel comprising:

a plurality of left-eye subpixels configured to display a left-eye image; and a plurality of right-eye subpixels configured to display a right-eye image;

wherein the plurality of left-eye subpixels and the plurality of right-eye subpixels comprise subpixels that have one of (i) two combined hexagonal shapes sharing upper and lower sides or (ii) three combined hexagonal shapes sharing upper and lower sides, as viewed in a plan view.

12. The stereoscopic image display panel according to claim 11, wherein each light-emitting region in one subpixel have a different shape.

13. The stereoscopic image display panel according to claim 11, wherein the plurality of left-eye subpixels and the plurality of right-eye subpixels further comprise subpixels that have one hexagonal shape, and wherein each subpixel having the hexagonal shape light-emitting region is a red subpixel, each subpixel having the two combined hexagonal shape light-emitting region is a green subpixel, and each subpixel having the three combined hexagonal shape light-emitting region is a blue subpixel.

14. The stereoscopic image display panel according to claim 13, wherein each of the red, green, and blue subpixels has a same shape light-emitting region.

15. The stereoscopic image display panel according to claim 11, wherein a color arrangement sequence of the plurality of left-eye subpixels and a color arrangement sequence of the plurality of right-eye subpixels are different from each other.

16. The stereoscopic image display panel according to claim 11, wherein positions of the light-emitting regions of the plurality of left-eye subpixels and positions of the light-emitting regions of the plurality of right-eye subpixels are different from each other.

17. The stereoscopic image display panel according to claim 11, wherein each of the light-emitting regions of the plurality of left-eye subpixels is disposed between the light-emitting regions of the plurality of right-eye subpixels, and
   each of the light-emitting regions of the plurality of right-eye subpixels is disposed between the light-emitting regions of the plurality of left-eye subpixels.

18. The stereoscopic image display panel according to claim 11, further comprising a parallax barrier disposed in front of the stereoscopic image display panel.

19. The stereoscopic image display panel according to claim 18, wherein the parallax barrier includes a plurality of blocking regions configured to block light from the stereoscopic image display panel and a plurality of transmission regions configured to transmit the light from the stereoscopic image display panel.

\* \* \* \* \*